United States Patent Office 3,459,381
Patented Aug. 5, 1969

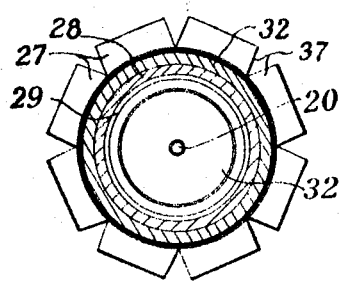
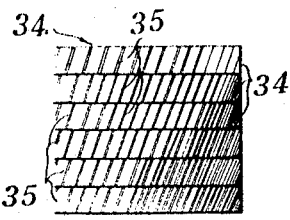
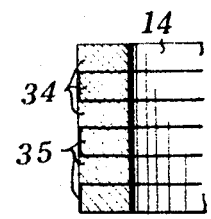
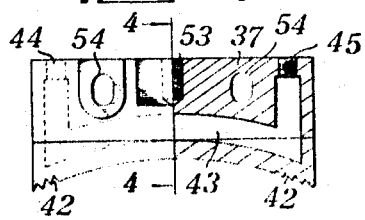
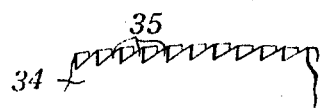
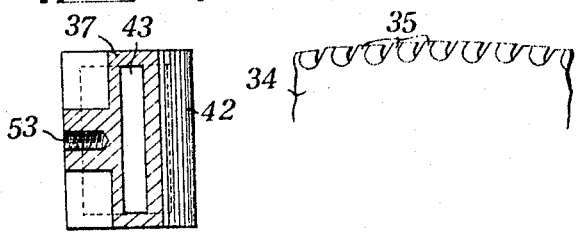
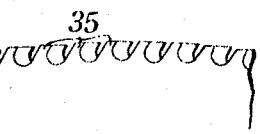
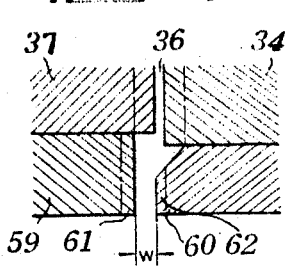
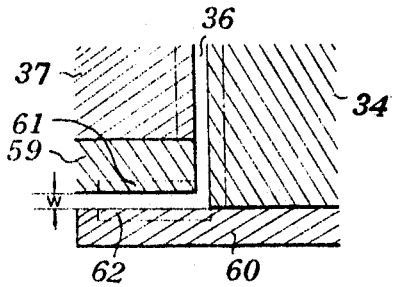

3,459,381
PULVERIZER
Keiichi Takahashi, Yao-shi, Osaka-fu, Japan, assignor to Horai Tekko Sho Co., Ltd., Osaka-shi, Japan
Filed Sept. 13, 1966, Ser. No. 579,146
Int. Cl. B02c 7/08, 7/17, 21/00
U.S. Cl. 241—67                                        3 Claims

ABSTRACT OF THE DISCLOSURE

A pulverizer is provided with a hollow rotary member having a plurality of annular cutting members disposed thereabout and a plurality of stationary cutter members, each of which is a hollow arcuate segment disposed in spaced annular relation about the rotary cutter members. A cooling fluid is circulated through the hollow rotary member and each of the hollow stationary members to remove the heat generated during the pulverizing operation. A pair of annular plates having predetermined spacing are disposed at the outlet end of the space between the rotary and stationary cutters to determine the final mesh of the pulverized material.

---

The present invention relates to a pulverizer of plastics and other similar materials. More particularly, it relates to a pulverizer of plastics and other materials comprising a cutter section which is the most important element, a means for removing undesirable heat produced at the cutter section when the machine is driven, and means for adjusting the degree of pulverization without using a sieve, with said both means being newly added to said cutter section in an improved way.

In general, a plastics pulverizer of this type has been arranged including a fixed cutter and a rotating cutter, and through high speed rotation of the rotating cutter, pulverization of plastic material introduced in between both cutters is effected. Most commonly employed of these conventional pulverizing devices is the type in which the rotating cutter blades are all provided with the same pitch and a ring-shaped cutter of the same pitch is in combination with the rotating cutter, with their blades being radially spaced from each other about the same axis. However, in the case where pulverization of coarse-shaped plastic material into fine grains is effected by the blades of uniform pitch arrangement, it is found that when the blades of large pitch are used, although their cutting is excellent, it is hard to produce fine grains, while small-pitched blades provide bad cutting. Further, during the pulverizing operation, there is produced friction or excess heat caused by crushing at the cutter section, which may result in adhesion of fused plastic materials or their defective cutting.

Moreover, conventional pulverizer of plastics require a sieving device to obtain fine grains of desired meshes and thus have the inevitable defect of enlarging the pulverizing mechanism.

The present invention is designed to eliminate all of these defects and is characterized by improving pulverization of fed material, removing heat produced during the operation and providing at the cutter section a pulverization adjusting means to obtain pulverulent bodies of desired meshes.

It is, therefore, an object of the present invention to provide a structure in which the rotating cutter is composed of a desired number of disc-shaped elements which are joined together to attain a desired thickness and with the blades formed at the periphery of each element arranged in such manner that the pitch of a lower blade is smaller than that of an upper one. Around this rotating cutter are radially provided the fixed cutters which are arranged adjustably for movement in the radial direction so that the coarse materials, as they are when first fed, are crushed by the coarse blades, with thus crushed materials being then further pulverized by the blades of gradually smaller pitch corresponding to the grain size, thus inhibiting stagnation of the materials between the blades and improving pulverizing capability.

It is another object of the invention to provide a cooled water circulating means in the inside of the rotating cutters and in the fixed cutters so that the cooled water is positively circulated from a water supply means, thereby dispelling heat which is generated during the operation of the cutters.

It is still another object of the invention to provide, at the lower end of the void between the rotating cutters and the fixed cutters, a passage space which directly communicates to said void so that the pulverization of material is adjusted to desired meshes at this space.

It is also an important object of the invention to form the pulverizing blades of any optional shape at the opposed walls which compose a passage space communicated to the pulverization space between the fixed cutters and the rotating cutters, and to properly adjust the passage width of the passage space.

It is an additional object of the invention to provide a sucking fan fixed to the rotation shaft of the rotating cutters, said fan being arranged at a lower part of the passage communicated to said passage space, whereby suction and discharge of pulverized material is effected in accordance with pulverizing operation of the cutters.

The detailed structure and actions of the present invention will become apparent with the following explanations of the accompanying drawings, in which:

FIGURE 2 is a plan view, partly in section, showing the relative positions of the fixed cutters and the rotating cutters.

FIGURE 3 is a plan view of a fixed cutter of which one-half is shown in section.

FIGURE 4 is a view of the section along line 4—4 of FIGURE 3 as taken from the arrow-marked direction.

FIGURE 5 is a partial side view of the peripheral part of the combined rotating cutters.

FIGURE 6 is a longitudinal sectional view of said rotating cutters.

FIGURES 7 and 8 are plan views of the cutter blades.

FIGURE 9 is a plan view showing a combined arrangement of the blades.

FIGURES 10 and 11 are sectional views of the principal part, with FIGURE 10 showing an embodiment in which the opening of the passage space formed at the bottom of the fixed cutters and the rotating cutters is provided in the direction of gravity and FIGURE 11 showing an embodiment in which said passage space is provided in the direction of centrifugal force.

Figure 1:
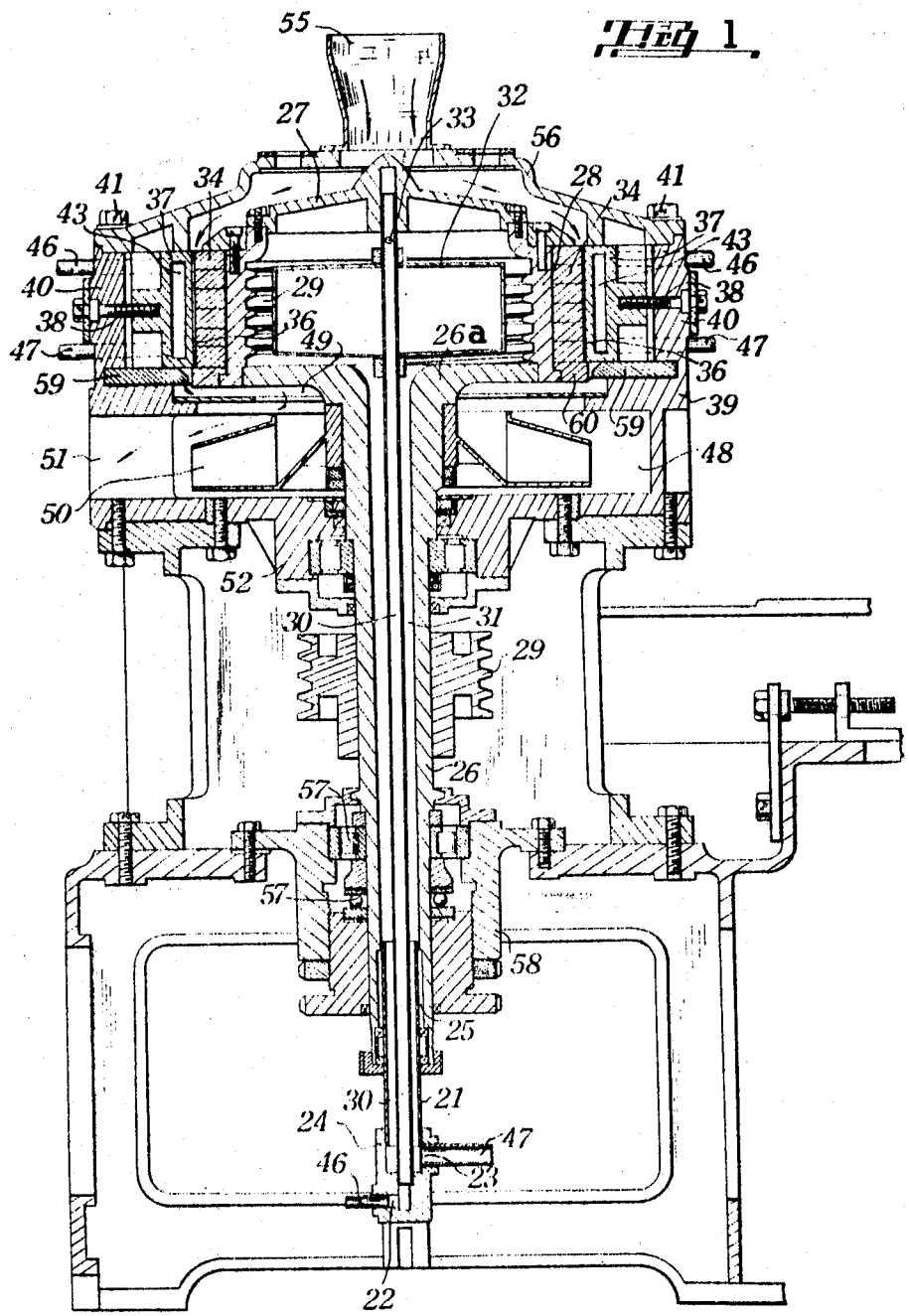
FIGURE 1 is a longitudinal sectional view showing the inside mechanism of the pulverizer of plastics of the present invention, in which the rotation driving mechanism, water supplying mechanism and material feeding mechanism are shown.

Referring to FIGURE 1, there is shown a hollow fixed shaft 21 which is fixed on a pedestal 24 having a water inlet 22 and a water exhaust port 23, with the lowermost end of said shaft being communicated to said exhaust port 23. On the outside of this shaft 21 is rotatably supported another hollow rotary shaft 26 through the medium of bearing 25, while the oustide of said rotary shaft 26 is rotatably supported by a shaft support 58 through the medium of bearing 57. At the periphery in about the middle part of said rotating shaft 26 is secured a driving pulley 29 which transmits rotation. Driving power of high speed rotation is transmitted to said pulley from a separately provided rotation power source (not shown) through an ordinary conveyor belt.

At the top 26a of said rotating shaft 26 is fitted a hollow rotor 28, the top of which is closed watertight by a cover block 27. The hollow section of said rotor 28 is communicated to the hollow section of said rotating shaft 26, and on the inner wall thereof is formed a spiral indentation 29 which serves as guide of cooling water and as radiation fins.

It will be seen that a water pipe 30, communicating to the water inlet 22 provided at the bottom of said pedestal 24, extends through the hollow of said rotating shaft 26 so that it forms a proper space with the shaft hole 31 of said rotating shaft. The upper end of said water pipe is supported at the center part on the inner face of the cover block 27 and a hollow cylinder 32 is fixed around the peripheral part of said water pipe 30 which lies in the rotor 28.

There is formed an optionally arranged void between the periphery of said hollow cylinder and the inner wall of the rotor 28 and a water outlet 33 is perforated through the surface of the water pipe 30 which appears above the hollow cylinder 32. The cooling water supplied into the water pipe 30 is discharged from this outlet 33 into the rotor 28 and then led from the rotor wall face through the shaft hole 31 of the rotating shaft 26 to the exhaust port 23 from which said water is released out of the machine. This operation is continuous during the operation of the pulverizing machine to continuously cool the rotor.

Around the periphery of said rotor 28 are secured several doughnut-shaped rotating cutters 34 which are placed in contact with each other.

Each cutter 34 has a doughnut-like configuration of uniform diameter, and the blades formed therearound are so arranged that a lower one has smaller pitch than an upper one. As is best shown in FIGURE 5, each blade is slightly slanted in the rotating direction or in the opposite direction.

It is desirable to arrange the rotating cutters 34 so that the blades of each adjoining cutter are slightly shifted from each other. This arrangement proves effective to keep the blades in a parallel-disposed condition as shown in FIGURE 9, to prevent the material from directly falling downward and to increase pulverizing efficiency.

Around the periphery of said rotating cutters are arranged the fixed cutters 37 with a proper pulverization space 36 being left therebetween, as best shown in FIGURES 2, 10 and 11.

As distinctly shown in the figures, several pieces of fixed cutters 37 having blades 42 parallel to the axial direction on the arc-shaped inner peripheral face thereof are fitted covering the entire outer periphery of the rotating cutters 34. Said fixed cutters 37 are supported on the side wall 40 of the machine frame 39 so as to be freely movable in the radial direction by the operation of adjusting screws 38 and are fixed in position by means of set bolts 41.

Each of said fixed cutters 37 has formed therein a water chamber 43 which has at one end a water inlet 44 and at the other end a discharge port 45 connected respectively to the water supply pipe 45 and the discharge pipe 47 which are both connected to a cooling water source (not shown) provided outside the machine so that the cooling water is circulated in the water chamber 43.

Thus, in the center of the back face of said fixed cutters 37, there are formed the screw holes 53 for insertion of the adjusting screws 38, and at both sides said cutters are longitudinally perforated by insertion holes 54 for the set bolts 41. These insertion holes 54 are elongated to allow for back and forth movement of the fixed cutters.

At the lower part of the side wall 40 of the machine frame 39 there is formed a take-out chamber 48 for pulverized material and a suction passage 49 thereabove is in communication with the pulverization space 36 between the cutters 34, 37. An exhaust port 51 is also provided from said chamber 48.

It will also be noted that in the inside of said take-out chamber 48 there is provided a suction fan 50 which is secured to the rotating shaft 26 and rotates integrally with said shaft.

The upper edge of the machine frame 39 is closed by a covering member 56, and in the center thereof is provided a feeding port 55 which opens to the outside. The material which was fed therethrough falls onto the surface of the covering block 27 of the rotor 28, is gathered at the peripheral edge by the centrifugal force and subsequently supplied to the pulverization space 36 between both cutters 34 and 37.

At the bottom end of the pulverization space 36 between cutters 34 and 37 there are provided controlling members 59 and 60 which are opposed to each other and the passage space W therebetween is set to be adjustable relative to the size of the pulverized material.

Two ways for arranging said controlling members 59 and 60 relative to each other are considered. In one case, as shown in FIGURE 10, there is formed a passage space where the pulverized materials fall in the direction of gravity, while in the other case, as shown in FIGURE 11, there is formed a passage space in which the pulverized materials are drawn out in the direction of centrifugal force. In either case, the passage space between said members communicates with the take-out chamber 48 having a suction fan 50 through a suction passage 49 which is directly communicated to the bottom of said members.

One of said controlling members 59 is provided fixedly at the bottom of the fixed cutters 34, while the other controlling member 60 is provided rotatably at the bottom of the rotating cutters 37.

In order to adjust the passage space between the members 59 and 60, it is necessary to disassemble the arrangement as shown in FIGURE 1 and replace at least one of the controlling members with another controlling member having different dimensions to thereby vary the passage space between the controlling members 59 and 60.

It is also possible to provide still finer blades 61 and 62, as occasion demands, on the opposed faces of said controlling members 59 and 60 so that further pulverization is conducted at this section and the pulverized materials are discharged into the take-out chamber 48.

Now, the operation of the plastics pulverizer of the present invention will be discussed.

First, the rotating shaft 26 is rotated about the fixed shaft 21 through a driving pulley 29 which transmits power from a power source outside the machine, whereby the rotor 28 arranged integral to said shaft is rotated at the same speed.

The roughly crushed materials to be pulverized which are successively fed by a proper amount through the feeding port 55 at the top of the machine frame fall on the slant surface of the cover block 27 of the rotor 28 and are immediately drawn toward the periphery by centrifugal force produced by the rotation and subsequently sucked in a quite natural manner into the pulverization space 36 between cutters 34 and 37 provided at the peripheral edge.

The materials entering said pulverization space 36 are subjected to gradually finer pulverization by the rotating cutters 34 which are arranged so that the blade pitch becomes finer downward, until they reach the distal end of the space. The pulverizing operation is conducted extremely efficiently without causing any blockade of materials between blades, with the pulverized materials being subsequently guided into the space between the controlling members 59 and 60 thereunder.

Said space W is previously set to particle diameter of desired size and when the materials pass through this space, require pulverization is completed. Thus, the desired pulverized materials pass through a passage 49 undergoing a sucking action by a suction fan 50 and then are smoothly received into the take-out chamber 48.

The arrow marks in FIGURE 1 show the course of the above said pulverization process.

The cooling water supplied from the water inlet 22 into the water pipe 30 provided in said rotating shaft 26 runs through said pipe 30 and is spouted from an aperture 33 formed at the upper end of said pipe, thus filling the space between the rotor 28 and the hollow cylinder 32.

In this case, the cooling water is guided downward along the spiral indentation 29 formed on the inner wall of the rotor 28, thereby effecting a cooling of the inner wall of the rotor 28 and thus dispelling heat generated by the pulverizing operation of the rotating cutters 34.

After flowing down along the inner wall surface of the rotor 28, the cooling water then passes through the shaft hole 31 of the rotating shaft 26 and then is discharged from the exhaust port 23 at the bottom of said shaft into the exhaust pipe 47.

This cooling operation is continuous to constantly eliminate heat during the opperation of the rotating cutters 34.

Also in the fixed cutters 37, the combined composition of a water supplying pipe 46, a water exhaust pipe 47 and a water chamber 43 provides a similar circulation of the cooling water to effect absorption and elimination of heat.

As viewed above, since the cooling operation is continued automatically during the operation of both cutters 34 and 37, it is possible to remove various troubles otherwise caused by heat produced by pulverization of the plastics materials and to effect a sound and stable pulverization.

Further, since the rotating cutters 34 are all doughnut-shaped and joined together concentrically in such manner that the blade pitch becomes gradually finer from the entrance toward the distal end, the materials are pulverized into gradually finer particles with excellent efficiency.

Moreover, with the provision of a passage space W between the controlling members 59 and 60 contingent to the pulverization space of both cutters 34 and 37, still further minute pulverization of uniform size of the material to be pulverized as well as adjustment of desired size may be automatically attained.

It is to be understood that the purpose of the present invention is not limited to the specific embodiments illustrated in the accompanying drawings, but involves various applications and modifications in designs, and also covers various possible structures having the basic principles of the present invention.

What is claimed is:

1. A pulverizing machine for plastics and other materials comprising a frame, a hollow cylindrical rotor journaled for rotation in said frame, feed means in said frame adjacent one end of said rotor, removal means for removing the pulverized material adjacent the other end of said rotor, annular cutting means secured to the outer surface of said rotor for rotation therewith, first cooling means disposed within said hollow cylindrical rotor, and stationary cutting means secured to the frame disposed about and spaced from the circumference of said annular cutting means comprising a plurality of arcuate segments adjustably mounted on said frame for radial movement with respect to the axis of said rotor to vary the spacing between said annular rotatable cutting means and said stationary cutting means with the arcuate face of said segments being provided with a plurality of cutting blades parallel to the axis of said rotor, each of said segments being provided with a hollow chamber and inlet and outlet means whereby a cooling medium may be circulated through said chamber to dissipate the heat generated by the pulverizing action of said cutting means.

2. A pulverizing machine for plastics and other materials as set forth in claim 1 further comprising a pair of spaced, opposed controlling members removable secured to said rotor and said frame respectively between said cutting means and said removal means to determine the final size of the pulverized material passing from said cutting means to said removal means.

3. A pulverizing machine as set forth in claim 2 wherein said controlling memebrs are each provided with minute pulverizing blades on the opposed surfaces thereof.

References Cited

UNITED STATES PATENTS

| | | | |
|---|---|---|---|
| 615,811 | 12/1898 | Cunningham | 241—257 |
| 1,159,138 | 11/1915 | Vecchiri | 241—257 |
| 1,290,734 | 1/1919 | Goodhue | 241—66 |
| 1,301,637 | 4/1919 | Bair | 241—244 |
| 1,556,927 | 10/1925 | Fritz | 241—257 |
| 2,167,214 | 7/1939 | Lasch et al. | 241—162 |
| 2,402,170 | 6/1946 | Lund | 241—67 |
| 2,609,993 | 9/1952 | Planiol | 241—67 |
| 2,749,053 | 6/1956 | Rieth | 241—257 |
| 2,751,157 | 6/1956 | Meyer et al. | 241—67 |
| 2,834,552 | 5/1958 | Gozzoli | 241—67 |
| 2,918,223 | 12/1959 | Eppenback | 241—67 |

FOREIGN PATENTS

| | | |
|---|---|---|
| 14,067 | 11/1908 | Great Britain. |
| 825,075 | 12/1959 | Great Britain. |
| 901,030 | 7/1962 | Great Britain. |
| 957,540 | 2/1957 | Germany. |
| 1,164,040 | 2/1964 | Germany. |

GERALD A. DOST, Primary Examiner

U.S. Cl. X.R.

241—257